US012761596B2

(12) United States Patent
Sasaki et al.

(10) Patent No.: US 12,761,596 B2
(45) Date of Patent: Oct. 13, 2026

(54) IMAGE FORMING APPARATUS THAT SETS PRINT CONDITION, GIVING PRIORITY TO EXCEPTIONAL SETTING APPLIED TO SPECIFIC PAGE OF DATA TO BE PRINTED, OVER GENERAL SETTING APPLIED TO ALL PAGES OF DATA TO BE PRINTED, AND COMPUTER-READABLE, NON-TRANSITORY RECORDING MEDIUM HAVING GENERATION PROGRAM FOR GENERATING JOB TICKET RECORDED THEREON

(71) Applicant: KYOCERA Document Solutions Inc., Osaka (JP)

(72) Inventors: Shunsuke Sasaki, Osaka (JP); Takanori Miyamoto, Osaka (JP); Daiki Sone, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 17 days.

(21) Appl. No.: 19/088,905

(22) Filed: Mar. 24, 2025

(65) Prior Publication Data

US 2025/0298355 A1 Sep. 25, 2025

(30) Foreign Application Priority Data

Mar. 25, 2024 (JP) ................................ 2024-048693

(51) Int. Cl.
*G03G 15/00* (2006.01)
*G06F 3/12* (2006.01)

(52) U.S. Cl.
CPC ....... *G03G 15/5016* (2013.01); *G06F 3/1205* (2013.01); *G06F 3/1208* (2013.01); *G06F 3/1253* (2013.01); *G06F 3/1285* (2013.01)

(58) Field of Classification Search
CPC . G03G 15/5016; G06F 3/1205; G06F 3/1208; G06F 3/1253; G06F 3/1285
See application file for complete search history.

(56) References Cited

U.S. PATENT DOCUMENTS

2005/0180793 A1* 8/2005 Nishiguchi .......... H04N 1/2315 358/1.13
2007/0165248 A1 7/2007 Utsunomiya et al.

FOREIGN PATENT DOCUMENTS

EP 3171262 A1 * 5/2017 ........... G06F 3/1222
JP 5372209 B2 12/2013

* cited by examiner

*Primary Examiner* — Sophia S Chen
(74) *Attorney, Agent, or Firm* — IP Business Solutions, LLC.

(57) ABSTRACT

An image forming apparatus includes an image forming device, and a control device that acts as an analyzer and a controller. The analyzer analyzes a job ticket in which a print setting is described, and specifies a print condition on a basis of the print setting. The controller executes a print job by controlling an operation of the image forming device according to the print condition, thereby forming an image represented by data to be printed, on a recording sheet. The analyzer specifies the print condition on a basis of a general setting to be applied to all pages of the data to be printed, and specifies, when an exceptional setting to be applied to a specific page of the data to be printed is described in the job ticket, the print condition giving priority to the exceptional setting, over the general setting.

6 Claims, 7 Drawing Sheets

IMAGE FORMING APPARATUS THAT SETS PRINT CONDITION, GIVING PRIORITY TO EXCEPTIONAL SETTING APPLIED TO SPECIFIC PAGE OF DATA TO BE PRINTED, OVER GENERAL SETTING APPLIED TO ALL PAGES OF DATA TO BE PRINTED, AND COMPUTER-READABLE, NON-TRANSITORY RECORDING MEDIUM HAVING GENERATION PROGRAM FOR GENERATING JOB TICKET RECORDED THEREON

INCORPORATION BY REFERENCE

This application claims priority to Japanese Patent Application No. 2024-048693 filed on Mar. 25, 2024, the entire contents of which are incorporated by reference herein.

BACKGROUND

The present disclosure relates to an image forming apparatus, and a computer-readable, non-transitory recording medium having a generation program recorded thereon, and in particular to a technique to execute a print job in accordance with a print condition.

In the printing industry, there are standard formats for describing print setting, called job definition format (JDF) and exchange job definition format (XJDF), based on a markup language called extensible markup language (XML). In the field of industrial printing, a technique to specify in detail the print conditions for executing a print job, using a job ticket in which the print setting is described in JDF, is generally known, for the purpose of realizing an extensive variety of printing formats.

SUMMARY

The disclosure proposes further improvement of the foregoing technique.

In an aspect, the disclosure provides an image forming apparatus including an image forming device and a control device. The image forming device forms an image on a recording sheet. The control device includes a processor, and acts as an analyzer and a controller, when the processor executes a control program. The analyzer analyzes a job ticket in which a print setting is described, and specifies a print condition on a basis of the print setting. The controller executes a print job by controlling an operation of the image forming device according to the print condition, thereby forming an image represented by data to be printed, on a recording sheet. The analyzer specifies the print condition on a basis of a general setting to be applied to all pages of the data to be printed, and specifies, when an exceptional setting to be applied to a specific page of the data to be printed is described in the job ticket, the print condition giving priority to the exceptional setting, over the general setting.

In another aspect, the disclosure provides a computer-readable, non-transitory recording medium having a generation program recorded thereon. The generation program is configured to cause a computer, including an operation device to which an instruction is inputted by a user, a display device, and a processor, to act as a display controller and a generator, when the processor executes the generation program. The display controller causes the display device to display a print setting screen, for accepting, with respect to each of print setting items, a general setting to be applied to all pages of data to be printed, and an exceptional setting to be applied to a specific page of the data to be printed. The generator generates, according to the instruction inputted by the user to the operation device through the print setting screen, a job ticket by describing the print setting indicated by the instruction of the user. When the general setting and the exceptional setting are applied to a same print setting item, the generator describes the exceptional setting after the general setting, when generating the job ticket.

DETAILED DESCRIPTION

Figure 1:
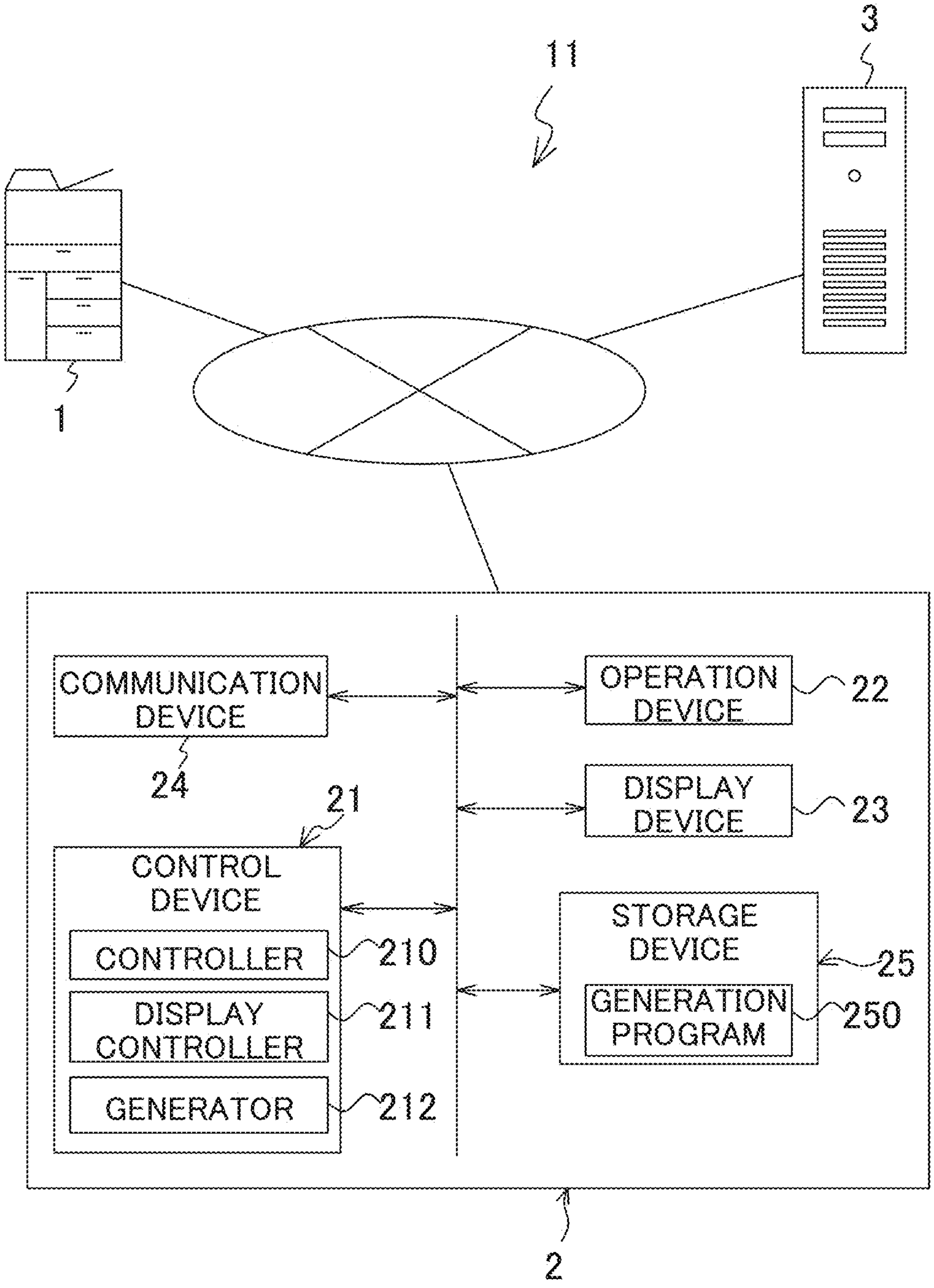
FIG. 1 is a schematic diagram showing an overall configuration of an image forming system, including an image forming apparatus according to an embodiment of the disclosure.

Hereafter, an image forming apparatus according to an embodiment of the disclosure, and a computer-readable, non-transitory recording medium having a generation program recorded thereon, will be described with reference to the drawings. FIG. 1 is a schematic diagram showing an overall configuration of an image forming system 11, including the image forming apparatus 1 according to the embodiment of the disclosure.

The image forming system 11 includes the image forming apparatus 1, an information processing apparatus 2, and a server 3, which are located on a network such as the internet. The image forming apparatus 1 is a multifunction peripheral having a plurality of functions, such as copying, printing, scanning, and facsimile transmission.

The information processing apparatus 2 may be, for example, a personal computer (PC). The information processing apparatus 2 includes a control device 21, an operation device 22, a display device 23, a communication device 24, and a storage device 25. These components can transmit and receive data or signals to and from each other, through a communication bus.

The operation device 22 includes a keyboard, a mouse, and so forth. The user can input a command or characters to the control device 21, or operate the pointer on the screen of the display device 23, through the operation device 22. To the operation device 22, the user's instruction is inputted, according to the operation performed thereon by the user.

The display device 23 includes, for example, a liquid crystal display (LCD). The display device 23 displays the response or data result from the control device 21. The display device 23 includes a touch panel overlaid on the screen, as a part of the operation device 22.

The communication device 24 is a communication interface that transmits and receives various types of data to and from an external device, such as the image forming apparatus 1 or the server 3 located inside a local area, or on the internet.

The storage device 25 is a large-capacity storage device such as a hard disk drive (HDD) or a solid-state drive (SSD), and contains various control programs. In the information processing apparatus 2, a generation program 250 is installed. The generation program 250 is stored in the storage device 25.

The control device 21 includes a processor, a random-access memory (RAM), a read-only memory (ROM), and an exclusive hardware circuit. The processor is, for example, a central processing unit (CPU), an application specific integrated circuit (ASIC), or a micro processing unit (MPU).

The control device 21 acts as a controller 210, when the processor operates according to the control program stored in the storage device 25. The control device 21 also acts as a display controller 211 and a generator 212, when the processor operates according to the generation program 250 stored in the storage device 25.

Here, the controller 210 and other components may be constituted in the form of a hardware circuit, instead of being realized by the operation of the control device 10 according to the control program. This also applies to other embodiments, unless otherwise specifically noted.

The controller 210 serves to control the overall operation of the information processing apparatus 2. The controller 210 is connected to the operation device 22, the display device 23, the communication device 24, and the storage device 25, and controls the operation of the mentioned components.

The display controller 211 causes the display device 23 to display a print setting screen, for accepting, with respect to each of, a general setting to be applied to all the pages of data to be printed, and an exceptional setting to be applied to a specific page of the data to be printed.

When the print setting screen is displayed, the operation device 22 receives the instruction designating the detail of the print setting, inputted by the user. For example, the operation device 22 receives the instruction, when the print setting screen is displayed, designating A4 size as the sheet size, as general setting (for the first to the Nth pages), and B5 size for the 10th page, and A3 size for the 15th page, which are specific pages, as exceptional setting.

The generator 212 generates a job ticket by describing, according to the instruction of the user inputted to the operation device 22 through the print setting screen, the instructed print setting in a predetermined format, in accordance with rules described hereunder. When the general setting and the exceptional setting are applied to the same print setting item, the generator 212 describes the exceptional setting after the general setting, when generating the job ticket.

Figure 2:
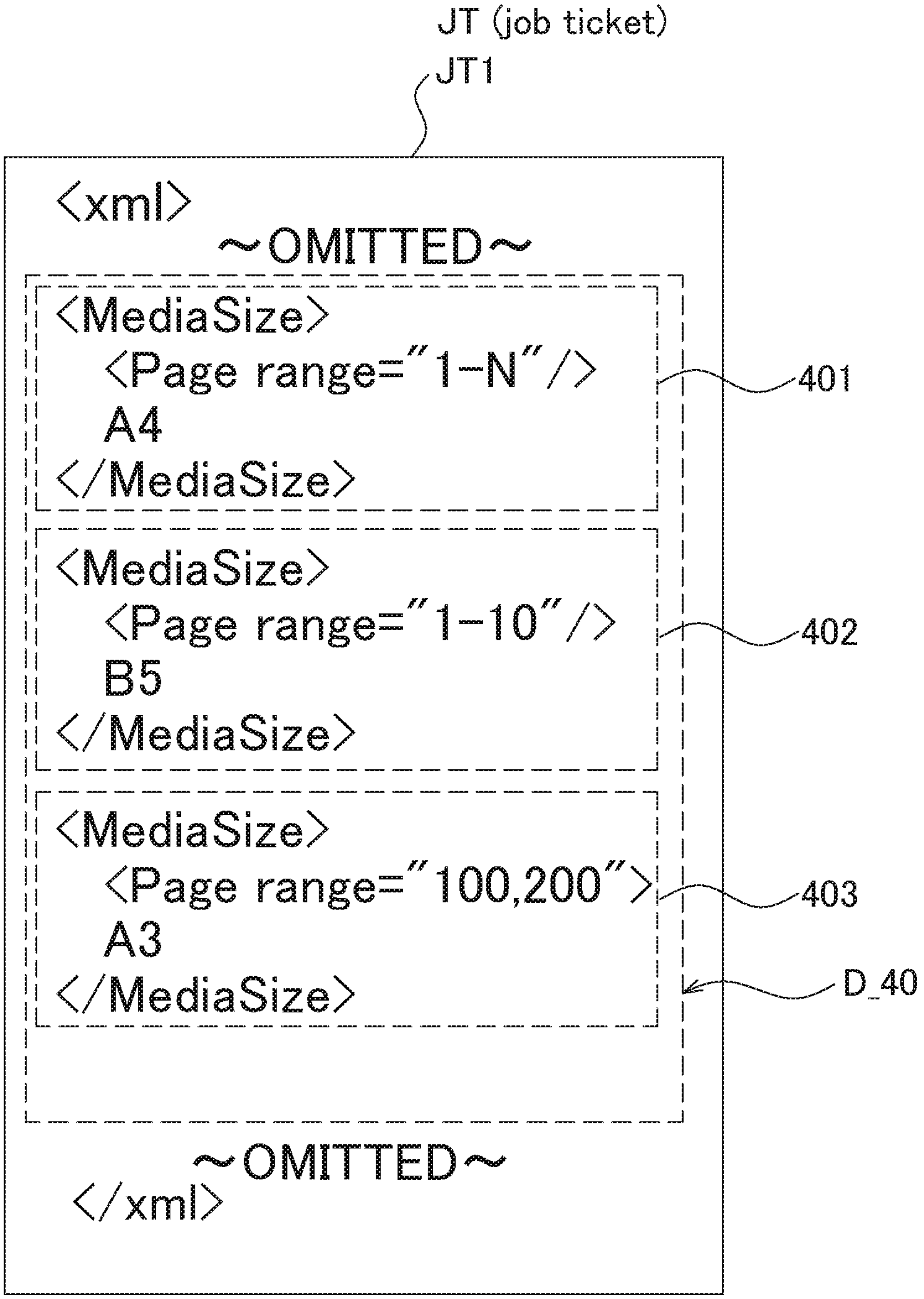
FIG. 2 to FIG. 5 are schematic drawings each showing an example of a job ticket.
Figure 3:
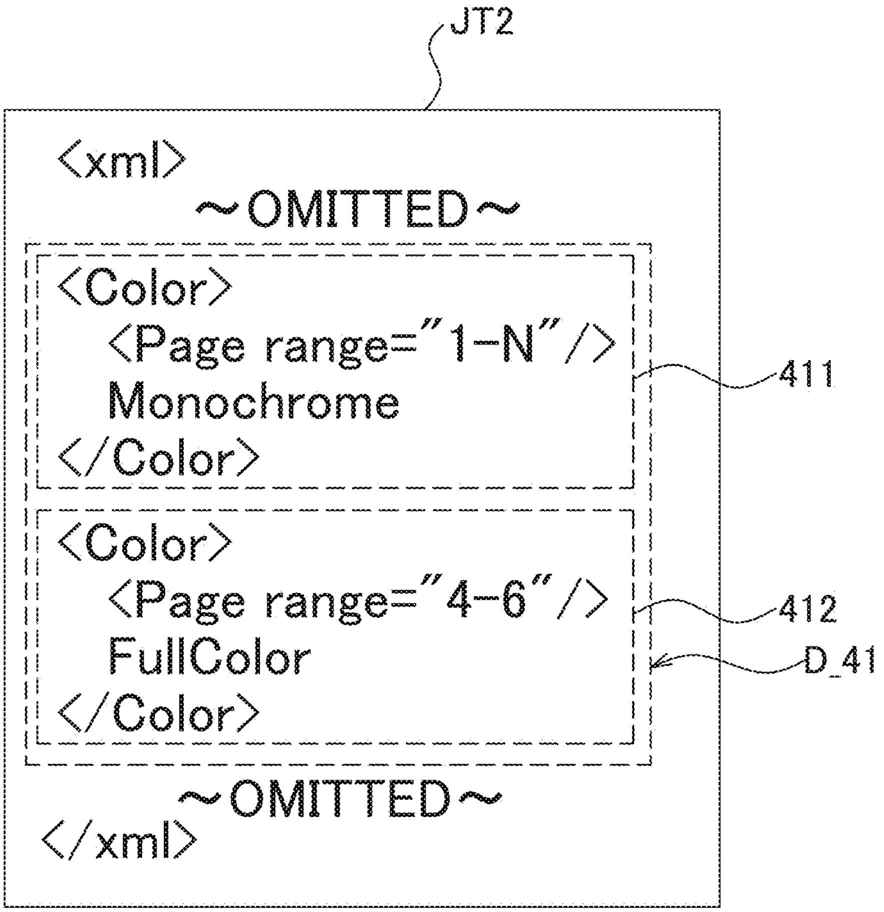

FIG. 2 and FIG. 3 each illustrate an example of the job ticket JT. The job ticket JT1 shown in FIG. 2, and the job ticket JT2 shown in FIG. 3 are each described in a predetermined format, and in XJDF in this example. Here, the job tickets may hereinafter be collectively referred to as job ticket JT, where appropriate.

The job ticket JT1 includes element syntaxes 401 to 403, each enclosed between (Media Size) serving as the start tag, and (/Media Size) serving as the end tag. These element syntaxes 401 to 403 constitute a print setting detail D_40. The job ticket JT1 is generated for defining the sheet size (Media Size), in the print setting detail D_40.

The job ticket JT2 includes the element syntaxes 411 and 412, each enclosed between the start tag (Color) and the end tag (/Color). These element syntaxes 411 and 412 constitute a print setting detail D_41. In other words, the description enclosed between the start tag and the end tag is construed as the element syntax (rule 1). The job ticket JT2 is generated for defining the color selection (Color), in the print setting detail D_41. Here, such print setting detail may hereinafter be collectively referred to as print setting detail D, where appropriate.

For example in the element syntax 401, at first A4 size is defined as the sheet size, and the first to the Nth pages (i.e., all the pages of the data to be printed) is defined as a page range. Regarding the page range, "1" is described as the value indicating the first page, and "N" is described as the value indicating the last page. Accordingly, on the basis of the designation of the page range from "1" to "N", it is construed that the element syntax is indicating the general setting for all the pages of the data to be printed (rule 2). The detail described first is defined as the element syntax 401 indicating the general setting for all the pages (rule 3). In this case, it is described that the sheet size is set to A4 size.

In the element syntax 402 following the element syntax 401, B5 size is defined as the sheet size, and the range from the first to 10th page is defined as the page range. In other words, the element syntax group that follows the element syntax indicating the general setting, is defined as the element syntax indicating an exceptional setting from the detail indicated by the element syntax 401 indicating the general setting (rule 4). In this case, it is described that the sheet size is set to B5 size, for the first page to the 10th page.

In the element syntax 403, A3 size is defined as the sheet size, and the 100th page and the 200th page are defined as the page range. As mentioned above, the element syntax 403 described after the element syntax 401 is defined as the exceptional setting. In this case, it is described that the sheet size is set to A3 size, for the 100th page and the 200th page.

Thus, in the job ticket JT1, the sheet size is set to A4 size, as basic setting for all the pages. As exceptional setting from such general setting, the sheet size is set to B5 size for the first to the 10th pages, and the sheet size is set to A3 size for the 100th page and the 200th page. As result, such print setting is described that the sheet size for the first to the 10th pages is B5 size, the sheet size for the 11th to 99th pages is A4, the sheet size for the 100th page is A3, the sheet size for the 101st to 199th pages is A4, the sheet size for the 200th page is A3, and the sheet size for the 201st and subsequent pages is A4.

To describe such print setting with the existing technique, the setting has to be defined with respect to each of the page ranges for different sheet sizes, and therefore six instructions have to be described. In contrast, with the job ticket according to this embodiment, the syntax first described is defined as the general setting, the syntax that follows the general setting is defined as the exceptional setting from the general setting, and the detail of the job ticket is construed according to such definition. Therefore, the print setting can be described with only three instructions, as shown in FIG. 2.

In the element syntax 411, described first in FIG. 3, "monochrome" is defined as the color selection, and the range from the first to the Nth page (i.e., all the pages of the data to be printed) is defined as the page range. In other words, the element syntax 411 describes that all the pages are to be printed in monochrome, as the general setting.

In the element syntax 412 that follows the element syntax 411, "full color" is defined as the color selection, and the range from the fourth to the sixth page is defined as the page range. In other words, the element syntax 412 describes that the fourth to the sixth pages are to be printed in full color, as the exceptional setting.

Thus, in the job ticket JT2, such print setting is described that the first to the third pages are printed in monochrome, the fourth to the sixth pages are printed in full color, and the seventh and subsequent pages are printed in monochrome.

To describe such print setting with the existing technique, three instructions have to be described. In contrast, according to this embodiment, the print setting can be described with only two instructions, as shown in FIG. 3.

When the user's instruction designating the detail of a print setting item, to be described as the exceptional setting, is received, but no instruction is received regarding the general setting, the generator 212 generates the job ticket by describing only the exceptional setting for the print setting item, without describing the general setting. Thus, the generator 212 may also generate the job ticket in which the general setting is not described, according to the instruction of the user.

Figure 4:
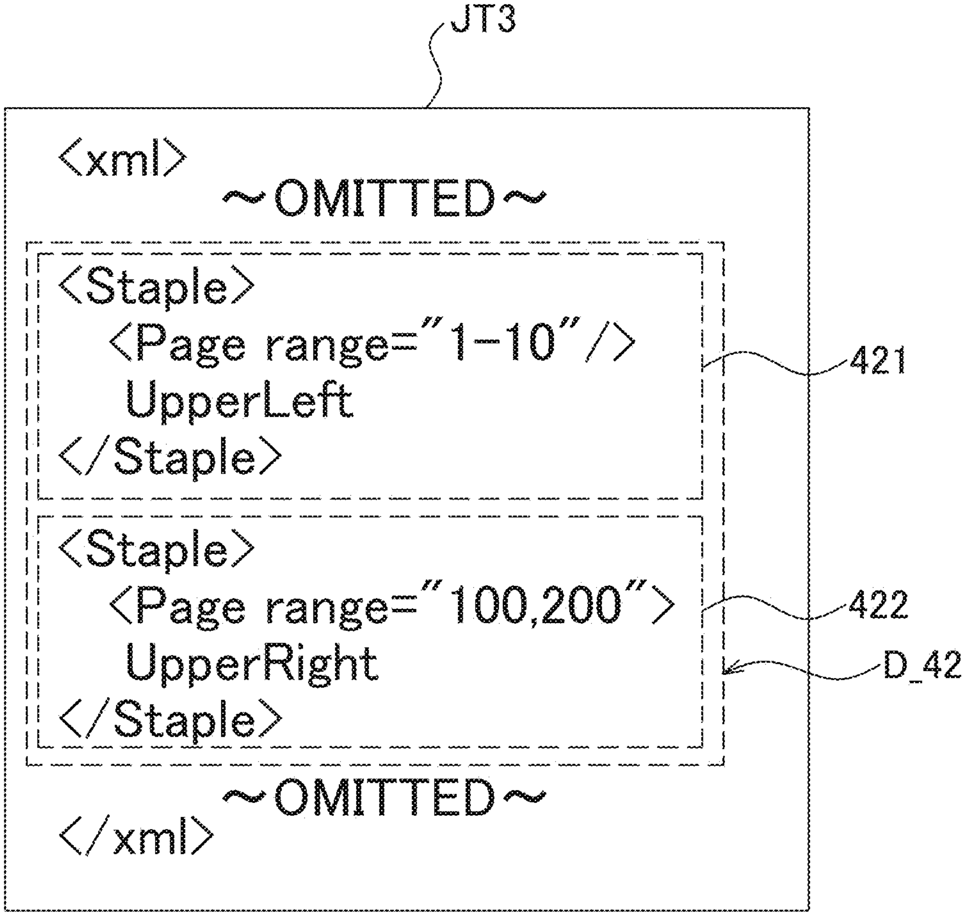

FIG. 4 illustrates an example of the job ticket in which the general setting is not described. The job ticket JT3 shown in FIG. 4 is described in XJDF, an example of the predetermined format. The job ticket JT3 includes element syntaxes 421 and 422, enclosed between the start tag (Staple) and the end tag (/Staple). These element syntaxes 421 and 422 constitute a print setting detail D_42. In the print setting detail D_42, the setting about the stapling function (Staple) is described.

For example in the element syntax 421, "upper left" is defined as the binding position of the staple, and the range from the first to the 10th page is defined as the page range. Thus, in the element syntax first described in the job ticket JT3, "1" is described to indicate the first page, and "10" is described to indicate the last page.

In other words, the page range of "1 to the Nth page" is not designated in the element syntax 421, which is the first one in the job ticket JT3, and therefore the element syntax 421 is construed as the exceptional setting (rule 5). The element syntax 421 describes that the binding position of the staple is upper left, with respect to the partial page range from the first to the 10th page. In such a case, the syntax described first is not construed as describing the general setting, and the general setting is construed as indicating a predetermined default value (rule 6).

In the element syntax 422, "upper right" is defined as the binding position of the staple, and the range from the 100th and the 200th page is defined as the page range. Accordingly, the element syntax 422 is also construed as describing, as the exceptional setting, that the binding position of the staple is upper right, with respect to the partial page range of 100th page and the 200th page. In this case, the default value to be adopted as the general setting can be construed as "without staple".

FIG. 2 to FIG. 4 each present a job ticket JT including only one print setting detail D. In other words, FIG. 2 to FIG. 4 represent the case where the single job ticket JT defines the print setting with respect to the single print setting item. However, the print setting that can be defined with a single job ticket JT is not limited to a single print setting item.

Figure 5:
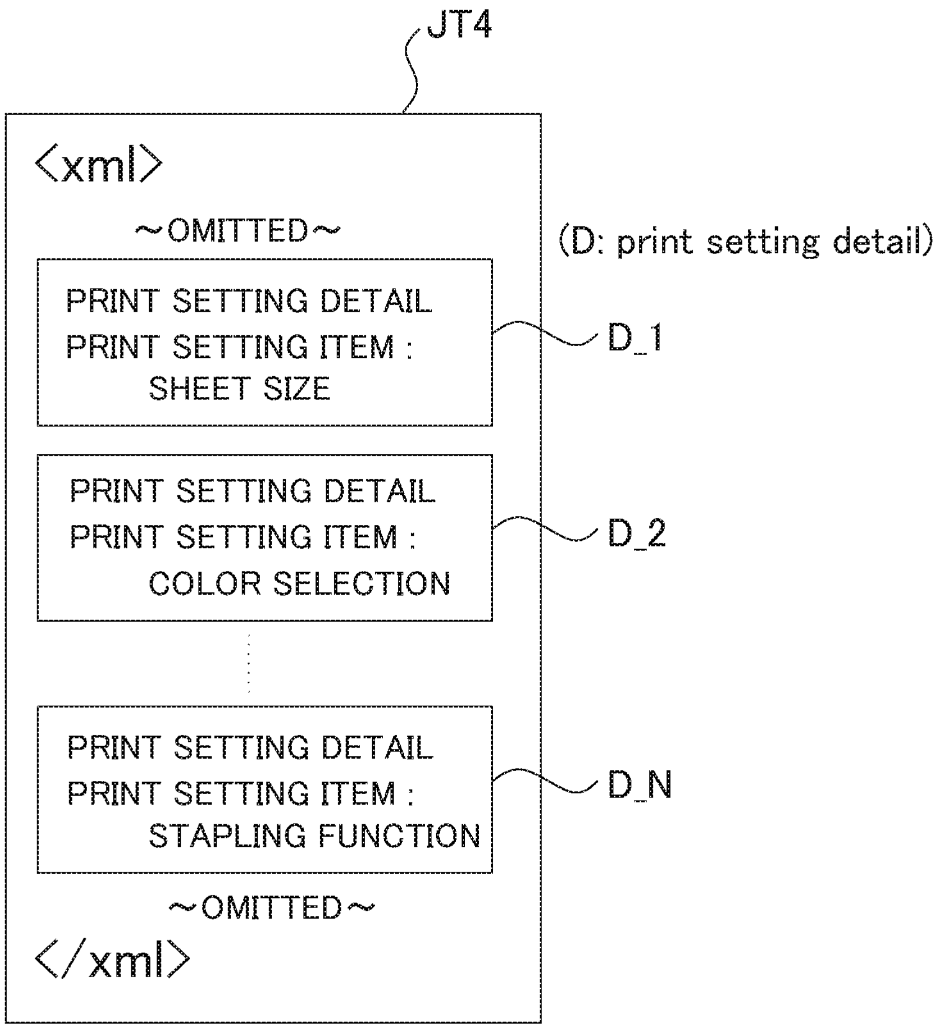

For example, the generator 212 can also generate, as shown in FIG. 5, a single job ticket JT4 in which the print setting is defined with respect to a plurality of print setting items. The job ticket JT4 shown in FIG. 5 includes a plurality of print setting details D_1, D_2, . . . . D_N. These print setting details D each correspond to one of the print setting details D_40, D_41, and D_42 shown in FIG. 2 to FIG. 4. Here, FIG. 5 is illustrated without the start tag, the end tag, and the values indicating the setting detail, to show the print setting detail in a simplified form.

When the operation device 22 receives the user's instruction to execute the print job using the job ticket JT, the controller 210 transfers the data to be printed and the data representing the job ticket JT, to a location that can be accessed from outside (e.g., storage device or storage region). In addition, the controller 210 notifies the location to which the data has been transferred, to the image forming apparatus 1 through the communication device 24, and requests the image forming apparatus 1 to execute the print job. The location that can be accessed from outside may be, for example, the storage device 25 of the information processing apparatus 2, or a shared folder formed in the server 3.

Figure 6:
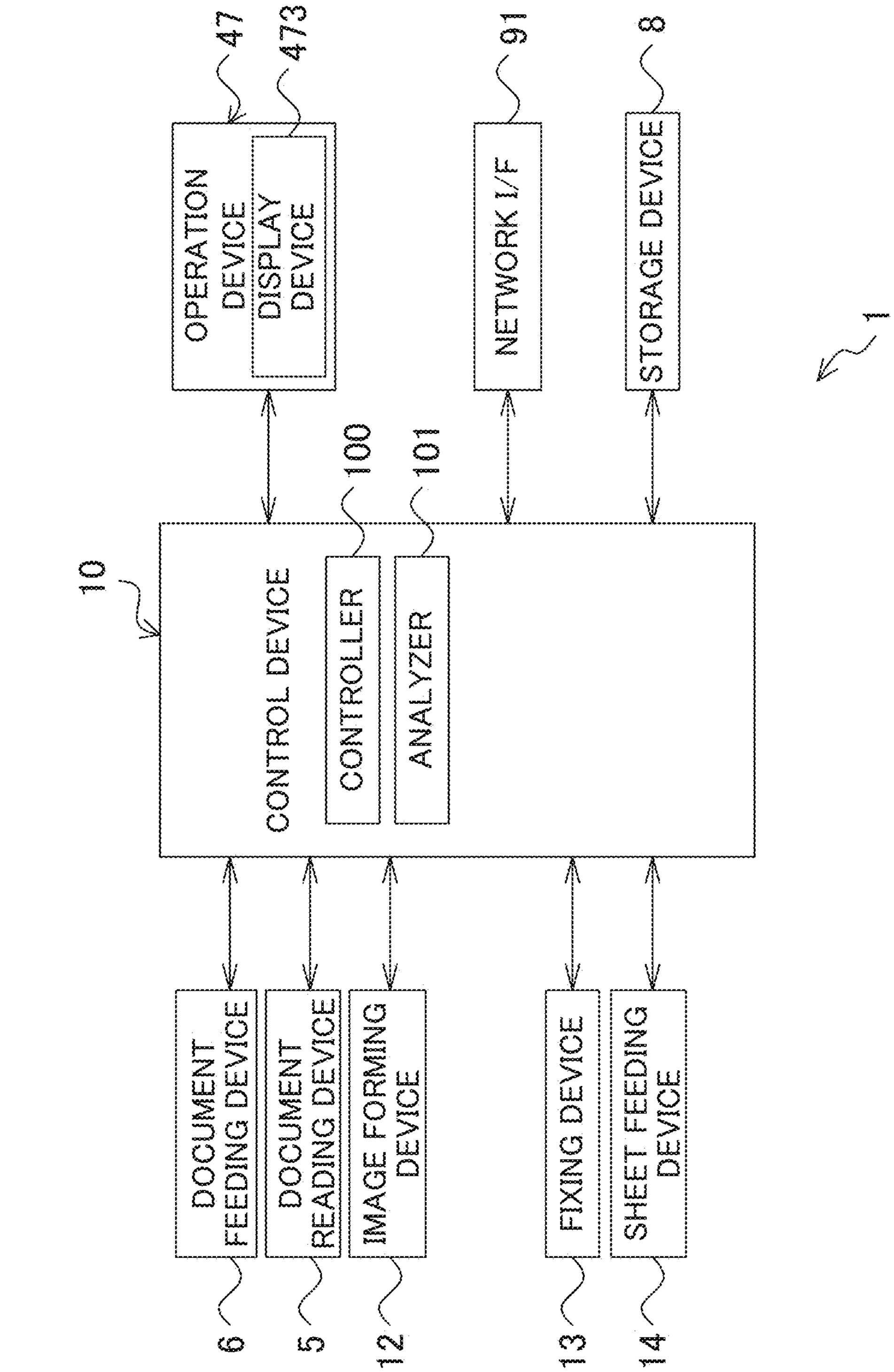
FIG. 6 is a functional block diagram, schematically showing an essential internal configuration of the image forming apparatus.

FIG. 6 is a functional block diagram, schematically showing an essential internal configuration of the image forming apparatus 1. The image forming apparatus 1 includes a control device 10, a document feeding device 6, a document reading device 5, an image forming device 12, a fixing device 13, a sheet feeding device 14, an operation device 47, a network interface (I/F) 91, and a storage device 8.

The document feeding device 6 is openably connected to the upper face of the document reading device 5, for example via a hinge. The document feeding device 6 serves as a document retention cover, when a document placed on a platen glass is to be read.

The document reading device 5 includes a scanner. The document reading device 5 reads the document delivered from the document feeding device 6, or the document placed on the platen glass. The document reading device 5 can sequentially read a plurality of documents delivered from the document feeding device 6.

To perform the document reading operation, the image forming apparatus 1 operates as follows. The document reading device 5 optically reads the image on the document delivered from the document feeding device 6 to the document reading device 5, or placed on the platen glass, and generates image data. The image data generated by the document reading device 5 is stored, for example, in an image memory.

To perform the image forming operation, the image forming apparatus 1 operates as follows. The image forming device 12 includes a photoconductor drum, a charging device, an exposure device, a developing device, and a primary transfer device for each of the colors. The image forming device 12 includes a mechanism that forms an image on a recording sheet, by secondary transfer via an intermediate transfer belt.

The image forming device 12 forms a toner image on the recording sheet delivered from the sheet feeding device 14, thereby producing a printed material, on the basis of the image data generated through the document reading operation, image data stored in the image memory, or image data received from a computer connected via the network.

The fixing device 13 includes a heat roller, a pressure roller, and a drive mechanism therefor. The fixing device 13 heats and presses the recording sheet on which the toner image has been formed by the image forming device 12, at the nip region defined between the mentioned rollers, to thereby fix the toner image onto the recording sheet. The recording sheet that has undergone the fixing process is delivered to an output tray.

The sheet feeding device 14 includes a sheet cassette. The sheet feeding device 14 also includes a pickup roller, transport rollers, a transport route, and rotational drive mechanism for the rollers, to pick up the recording sheet from the sheet cassette and transport the recording sheet to the image forming device 12.

The operation device 47 includes various hard keys to be operated by the user. The operation device 47 receives the user's instructions inputted with the hard keys, to execute the functions and operations that the image forming apparatus 1 is configured to perform, for example the image forming operation.

The operation device 47 includes a display device 473 for displaying, for example, an operation guide for the user. The operation device 47 receives, through a touch panel provided on the display device 473, the user's instruction based on the touch operation performed by the user on the screen displayed on the display device 473.

The display device 473 includes, for example, an LCD. When the user touches a button or a key displayed on the screen, the touch panel receives the instruction corresponding to the touched position. In this case, the touch panel acts as a part of the operation device.

The network I/F 91 is a communication interface that transmits and receives various types of data to and from an external device (e.g., information processing apparatus 2 or server 3) located inside the local area, or on the internet.

The storage device 8 is a large-capacity storage device such as a hard disk drive (HDD) and a solid-state drive (SSD). The storage device 8 contains various control programs.

The control device 10 includes a processor, a RAM, a ROM, and an exclusive hardware circuit. The processor is, for example, a CPU, an ASIC, or an MPU.

The control device 10 acts as a controller 100 and an analyzer 101, when the processor operates according to the control program stored in the storage device 8. Here, the controller 100 and the analyzer 101 may be constituted in the form of a hardware circuit, instead of being realized by the operation of the control device 10 according to the control program. This also applies to other embodiments, unless otherwise specifically noted.

The controller 100 serves to control the overall operation of the image forming apparatus 1. The controller 100 is connected to the document feeding device 6, the document reading device 5, the image forming device 12, the fixing device 13, the sheet feeding device 14, the operation device 47, the network I/F 91, and the storage device 8. The controller 100 controls the operation of the mentioned components, and executes, for example, the processings required for the image forming operation to be performed by the image forming apparatus 1.

The analyzer 101 analyzes the job ticket in which the print setting is described, according to predetermined rules (e.g., the rules 1 to 6), and specifies the print condition for executing the print job, on the basis of the print setting acquired through the analysis. The analyzer 101 sequentially analyzes the print setting described in the job ticket from the top, thereby identifying the general setting and the exceptional setting, and specifies the print condition, giving priority to the exceptional setting, over the general setting.

For example, when analyzing the job ticket JT1 shown in FIG. 2, the analyzer 101 analyzes the element syntaxes 401 to 403 in this order. The analyzer 101 construes that the element syntax 401 represents the general setting, and specifies the print condition that the sheet size for the first page to the Nth page (all the pages of the data to be printed) is A4 size. Then the analyzer 101 analyzes the element syntax 402 as the exceptional setting.

Although the print setting described in the element syntax 402 is inconsistent with the print setting described in the element syntax 401, the analyzer 101 overwrites the print condition with the sheet size of B5, with respect to the first page to 10th page, with priority given to the element syntax 402 describing the exceptional setting. Then the analyzer 101 analyzes the element syntax 403.

Although the print setting described in the element syntax 403 is inconsistent with the print setting described in the element syntax 401, the analyzer 101 overwrites the print condition with the sheet size of A3, with respect to the 100th page and the 200th page, with priority given to the element syntax 403 describing the exceptional setting.

Thus, the analyzer 101 analyzes the job ticket JT1 as above, thereby specifying such a print condition that the sheet size for the first to the 10th pages is B5 size, the sheet size for the 11th to 99th pages is A4, the sheet size for the 100th page is A3, the sheet size for the 101st to 199th pages is A4, the sheet size for the 200th page is A3, and the sheet size for the 201st and subsequent pages is A4.

When the exceptional setting to be applied to a specific page of the data to be printed is described in the job ticket JT, but the general setting to be applied to all the pages is not described in the job ticket, the analyzer 101 specifies, as described above, the print condition for the image forming apparatus 1, indicating a default setting represented by a predetermined default value, as the general setting. When specifying the print condition, the analyzer 101 gives priority to the exceptional setting, over the general setting (default setting).

For example, when analyzing the job ticket JT3 shown in FIG. 4 according to the rules 1 to 6, the analyzer 101 analyzes the element syntaxes 421 and 422 in this order. The analyzer 101 analyzes the element syntax 421, and upon deciding that the element syntax 421 is not describing the general setting about the stapling function, the analyzer 101 specifies the print condition, with the default setting (e.g., stapling function "N/A" indicating that the setting about the stapling is not applicable) defined as the general setting.

Although the print setting described in the element syntax 421 representing the exceptional setting is inconsistent with the general setting (default setting that the stapling function is N/A), the analyzer 101 gives priority to the exceptional setting, and overwrites the print setting with such setting that the stapling function is valid, and that the binding position is upper left, with respect to the first to the 10th pages, and then analyzes the element syntax 422.

Although the print setting described in the element syntax 422 representing the exceptional setting is inconsistent with the general setting (default setting that the stapling function is N/A), the analyzer 101 gives priority to the exceptional setting, and overwrites the print setting with such setting that the stapling function is valid, and that the binding position is upper right, with respect to the 100th page and the 200th page.

Thus, the analyzer 101 analyzes the job ticket JT3, thereby specifying such a print condition that the stapling function is valid and the binding position is upper left, for the first to the 10th pages, that the stapling function is N/A for the eleventh to the 99th pages, that the stapling function is valid and the binding position is upper right, for the 100th page, that the stapling function is N/A for the 101st to the 199th pages, that the stapling function is valid and the binding position is upper right, for the 200th page, and that the stapling function is N/A for the 201st and the subsequent pages.

The controller 100 controls the operation of the image forming device 12 so as to execute the print job, according to the print condition specified by the analyzer 101, thereby forming the image represented by the data to be printed, on the recording sheet.

For example, the controller 100 receives the notice from the information processing apparatus 2, notifying the storage location of the data to be printed and the data representing the job ticket JT, through the network I/F 91. Upon receipt of the request to execute the print job, from the information processing apparatus 2, the controller 100 makes access to the mentioned storage location through the network I/F 91, and acquires the job ticket JT and the data to be printed. The analyzer 101 analyzes the job ticket JT and specifies the print condition, and the controller 100 executes the print job, on the basis of the analysis result provided by the analyzer 101.

Figure 7:
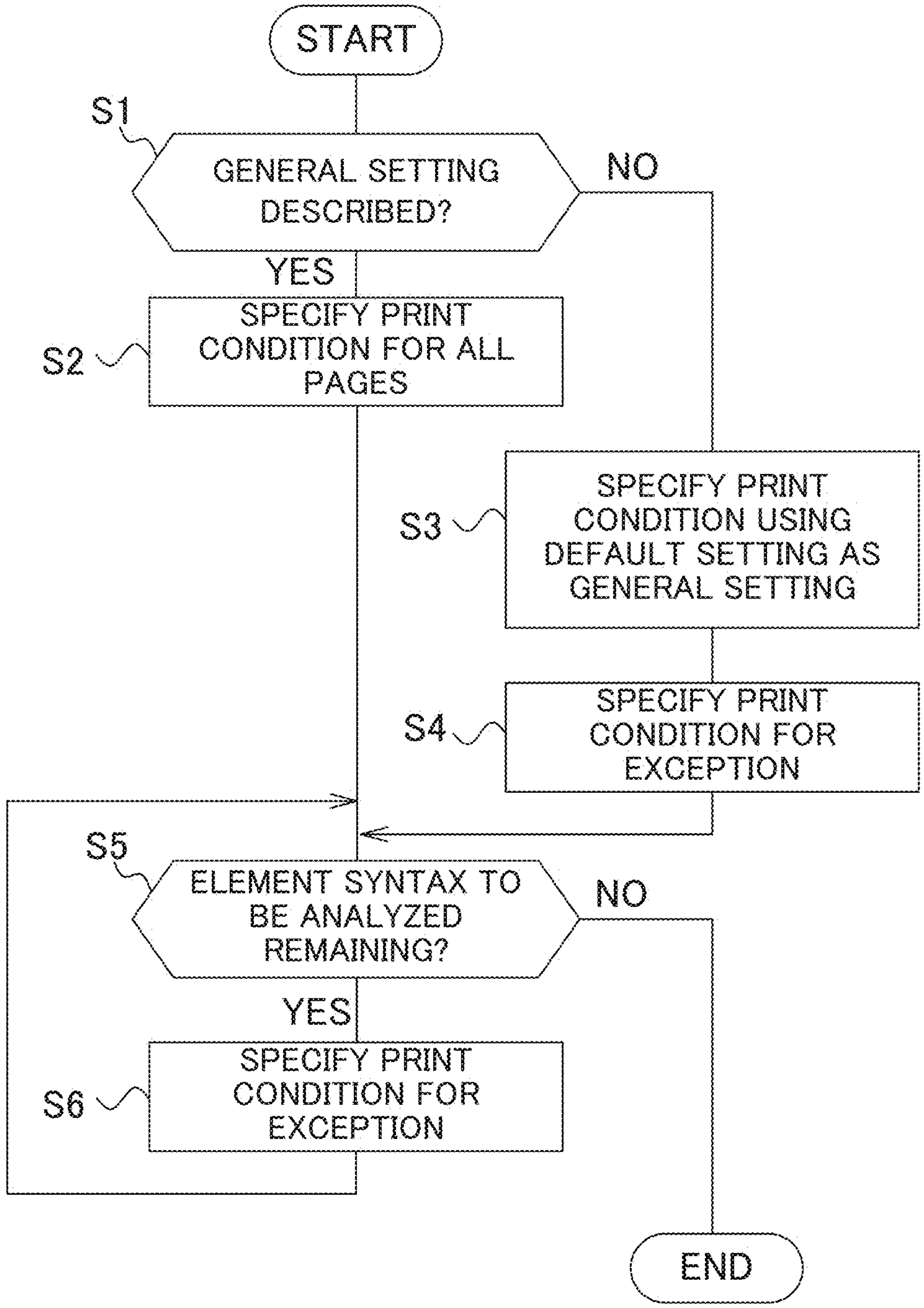
FIG. 7 is a flowchart showing an example of a print condition specifying process.

Referring now to a flowchart shown in FIG. 7, an example of the print condition specifying process will be described in further detail. This process is performed by the analyzer 101 of the control device 10 of the image forming apparatus 1, and includes analyzing the print setting detail D described in the job ticket JT, thereby specifying the print condition.

The analyzer 101 analyzes the element syntax described at the top of the print setting detail D, and decides whether the general setting is described (step S1). Upon deciding that the general setting is described at the top of the print setting detail D (YES at step S1), the analyzer 101 specifies the print condition for all the pages, on the basis of the print setting (general setting) described in the element syntax (step S2).

In contrast, upon deciding that the general setting is not described at the top of the print setting detail D (NO at step S1), the analyzer 101 specifies the print condition for all the pages, adopting the default setting as the general setting (step S3). After step S3, the analyzer 101 specifies the print condition according to the print setting (exceptional setting) described in the element syntax, with respect to the exceptional page (step S4).

The analyzer 101 then decides whether any element syntax to be analyzed remains in the print setting detail D (step S5). Upon deciding that the element syntax to be analyzed remains in the print setting detail D (YES at step S5), the analyzer 101 analyzes the remaining element syntax, and specifies the print condition with respect to the exceptional page, on the basis of the print setting (exceptional setting) described in the element syntax, with priority over the general setting or default setting (step S6).

After step S6, the analyzer 101 returns to step S5. On the other hand, upon deciding that no element syntax to be analyzed remains (NO at step S5), the analyzer 101 finishes the print condition specifying process.

Now, by utilizing the job ticket, the sheet size can be designated as desired, with respect to each of the pages, such that, for example, the first to the third pages are to be printed in A4 size (first instruction), the fourth page is to be printed in B5 size (second instruction), the fifth to the eighth pages are to be printed in A4 size (third instruction), the ninth page is to be printed in A3 size (fourth instruction), and the tenth page is to be printed in A4 size (fifth instruction), when 10 pages of documents are to be printed.

However, with the aforementioned existing technique, the job ticket becomes lengthy, and the data amount is increased. To specify the sheet size as above for example, five instructions have to be described.

In the foregoing embodiment, in contrast, the general setting (basic setting) is described first, and the exceptional setting, which is a partial setting, is described after the general setting, in the job ticket JT. Such an arrangement enables the general setting to be handled as the base, and the partial setting to be handled as exception, and therefore the element syntax for describing the setting, or the amount of the description can be reduced. As result, the data amount of the job ticket can be reduced.

According to the existing technique, the basic setting and the exceptional setting are alternately described in the job ticket JT, when the exceptional setting is described therein. For example, when the setting of the sheet size is switched in the order of basic setting (A4 size), exceptional setting (B5 size), basic setting (A4 size), exceptional setting (A3 size), and basic setting (A4 size), the element syntaxes respectively indicating the basic setting (A4 size), the exceptional setting (B5 size), the basic setting (A4 size), the exceptional setting (A3 size), and the basic setting (A4 size) have to be described in this order, in the job ticket JT.

For example, when there are x pieces of exceptional settings, there should be (x+1) pieces of basic settings. However, when the exceptional settings and the basic settings do not alternately appear, but the exceptional settings successively appear, for example in the order of basic setting (A4 size), exceptional setting (B5 size), exceptional setting (A3 size), and basic setting (A4 size), the number of basic settings becomes fewer than (x+1) pieces.

On the assumption that, for example, the number of characters required for each of the exceptional setting and the basic setting is 20 characters, and the number of characters required for other description is 200 characters, the number of characters WC1 described in the job ticket JT is expressed as "200+20 (x+1)+20x", according to the existing technique. However, according to the embodiment, it suffices that the basic setting is described once, and therefore the number of characters WC2 described in the job ticket JT can be expressed as "200+20+20x", which is 20× characters less (difference Δ=WC1−WC2).

The reduction rate of the number of characters described in the job ticket JT can be expressed as "Δ/number of characters WC1", which can be converted to "x/(11+2x)". Therefore, when there are 10 pieces of exceptional settings, the number of characters can be reduced by approximately 32% (~10/(11+2*10), and when there are 40 pieces of exceptional settings, the number of characters can be reduced by approximately 44% (~40/(11+2*40).

Here, the above refers to the reduction rate of each of the print setting items. Accordingly, in the case where, for example, there are ten print setting items, and the reduction rate of each of those items is 20%, 20%, 10%, 10%, 25%, 25%, 15%, 15%, 10%, and 10%, the overall reduction rate can be calculated as 16%, which is the average of these rates.

As a variation of the foregoing embodiment, the analyzer 101 may be configured to analyze a plurality of job tickets JT, and specify the print condition on the basis of the print setting described in the plurality of job tickets JT. In this case, when the print setting described in the job ticket JT analyzed later is inconsistent with the print setting described in the job ticket JT analyzed earlier, the analyzer 101 may specify the print condition on the basis of the print setting described in the job ticket JT analyzed later, with priority over the earlier one.

Some of the existing image forming apparatuses possess a hot folder function. With the hot folder function, when a file to be printed, such as a document, is put (dragged and dropped) into a folder linked with the print setting (hot folder), the print job is automatically executed, according to the linked print setting.

In the case where the hot folder is tiered, the image forming apparatus 1 possesses a main hot folder and a sub hot folder, and different job tickets JT are respectively linked with the main hot folder and the sub hot folder, the image forming apparatus 1 according to the mentioned variation can execute the setting.

The computer-readable, non-transitory recording medium, having the generation program according to the embodiment recorded thereon, can be exemplified by a hard disk, a CD-ROM, a DVD-ROM, or a semiconductor memory.

The disclosure may be modified in various manners, without limitation to the foregoing embodiment. Further, the configurations and processings described in the embodiment with reference to FIG. 1 to FIG. 7 are merely exemplary, and in no way intended to limit the disclosure to those configurations and processings.

While the present disclosure has been described in detail with reference to the embodiments thereof, it would be apparent to those skilled in the art that various changes and modifications may be made therein within the scope defined by the appended claims.

What is claimed is:

1. An image forming apparatus comprising:

an image forming device that forms an image on a recording sheet; and a control device including a processor, and configured to act, when the processor executes a control program, as:

an analyzer that analyzes a job ticket in which a print setting is described, and specifies a print condition on a basis of the print setting; and a controller that executes a print job by controlling an operation of the image forming device according to the print condition, thereby forming an image represented by data to be printed, on a recording sheet, wherein the analyzer specifies the print condition on a basis of a general setting to be applied to all pages of the data to be printed, and specifies, when an exceptional setting to be applied to a specific page of the data to be printed is described in the job ticket, the print condition giving priority to the exceptional setting, over the general setting.

2. The image forming apparatus according to claim 1, wherein, when the exceptional setting is described in the job ticket but the general setting is not described in the job ticket, the analyzer specifies the print condition using a predetermined default setting as the general setting, and gives priority to the exceptional setting over the general setting, when specifying the print condition.

3. The image forming apparatus according to claim 1, wherein the analyzer sequentially analyzes a first job ticket and a second job ticket, and specifies the print condition on a basis of a first print setting described in the first job ticket, and a second print setting described in the second job ticket, and when the second print setting described in the second job ticket analyzed later is inconsistent with the first print setting described in the first job ticket analyzed earlier, the analyzer specifies the print condition giving priority to the second print setting, over the first print setting.

4. The image forming apparatus according to claim 1, wherein the analyzer construes that a print setting designating a page range from a first page to a last page, is the general setting.

5. A computer-readable, non-transitory recording medium having a generation program recorded thereon, the generation program being configured to cause a computer, including an operation device to which an instruction is inputted by a user, a display device, and a processor, to act, when the processor executes the generation program, as:

a display controller that causes the display device to display a print setting screen, for accepting, with respect to each of print setting items, a general setting to be applied to all pages of data to be printed, and an exceptional setting to be applied to a specific page of the data to be printed; and a generator that generates, according to the instruction inputted by the user to the operation device through the print setting screen, a job ticket by describing the print setting indicated by the instruction of the user, wherein, when the general setting and the exceptional setting are applied to a same print setting item, the generator describes the exceptional setting after the general setting, when generating the job ticket.

6. The computer-readable, non-transitory recording medium according to claim 5, wherein, when the instruction of the user indicates the exceptional setting, but not the general setting, with respect to a predetermined print setting item, the generator generates the job ticket without describing the general setting with respect to the predetermined print setting item.

* * * * *